United States Patent

Peterson

[15] 3,660,653
[45] May 2, 1972

[54] RAILROAD CAR SPEED CONTROL MECHANISM

[72] Inventor: William H. Peterson, Homewood, Ill.
[73] Assignee: Pullman Incorporated, Chicago, Ill.
[ * ] Notice: The portion of the term of this patent subsequent to Aug. 18, 1987, has been disclaimed.
[22] Filed: June 5, 1970
[21] Appl. No.: 43,902

[52] U.S. Cl................................................246/182 B, 303/20
[51] Int. Cl..........................................................B61l 3/12
[58] Field of Search....................................240/182 B; 303/20

[56] References Cited

UNITED STATES PATENTS 3,584,214   6/1971   Peterson...............................246/182 B Primary Examiner—Arthur L. La Point
Assistant Examiner—George H. Libman
Attorney—Hilmond O. Vogel and Wayne Morris Russell

[57] ABSTRACT

A railroad car speed control device including a car wheel-driven generator, a generator-operated solenoid valve and centrifugal switch being energized by a ground-mounted magnet for operating the air brakes in accordance with vehicle speed wherein a positive pressurehead is maintained on a pneumatic motor to keep the generator away from the car wheel, the generator wheel being provided with a shock-resistant flexible connection, a magnetic responsive reed switch having magnetic flux collecting means to be acted upon by a ground-mounted magnet for completing the generator circuit and wherein there is provided a novel shuttle valve arrangement for selectively sending the brake air pressure by way of the conventional AB valve or by way of the additional reservoir.

13 Claims, 7 Drawing Figures

PATENTED MAY 2 1972 3,660,653
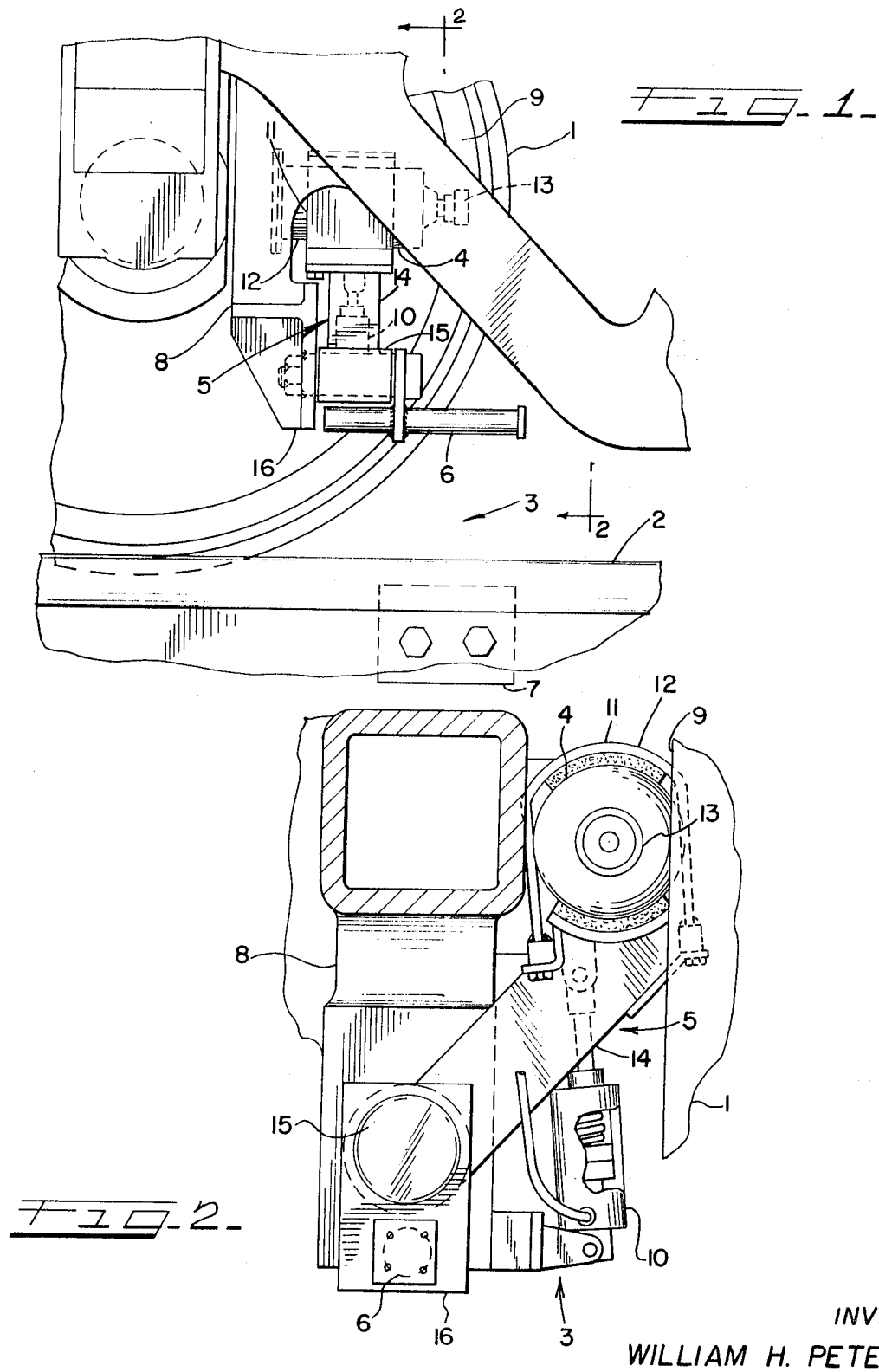
INVENTOR
WILLIAM H. PETERSON
BY Richard J. Myers
ATT'Y.

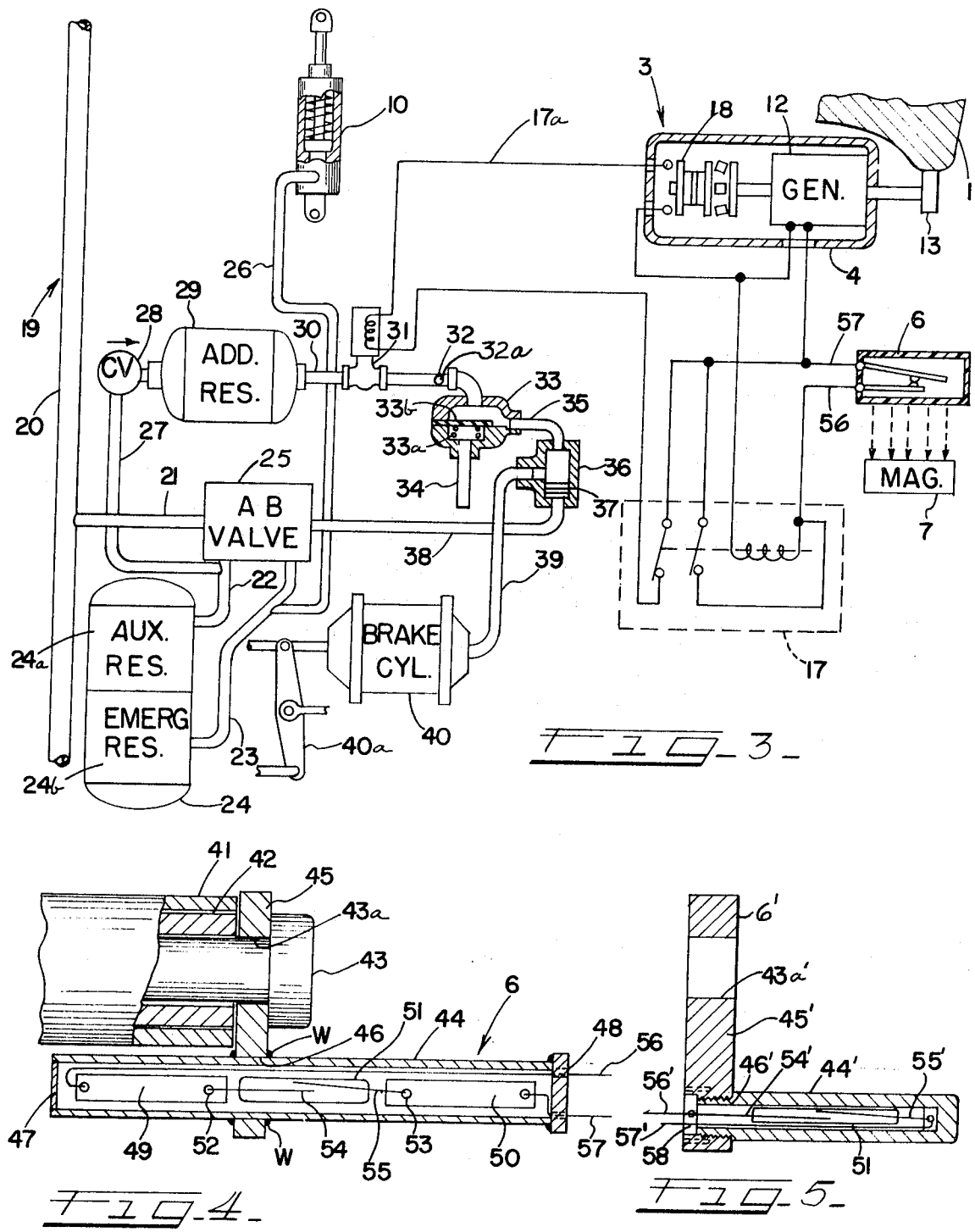

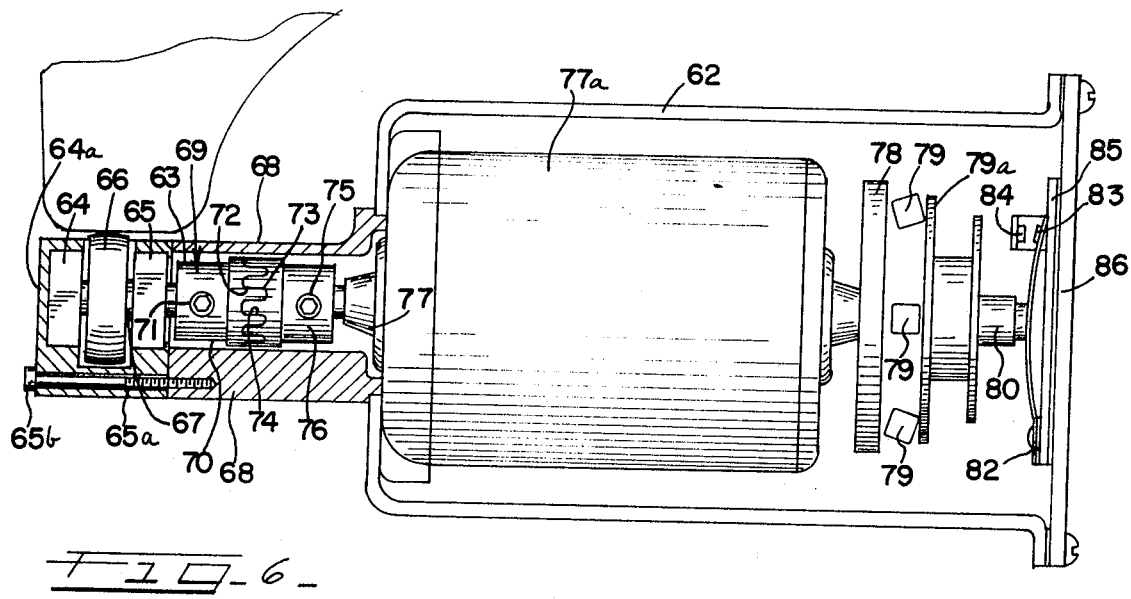
FIG-6-
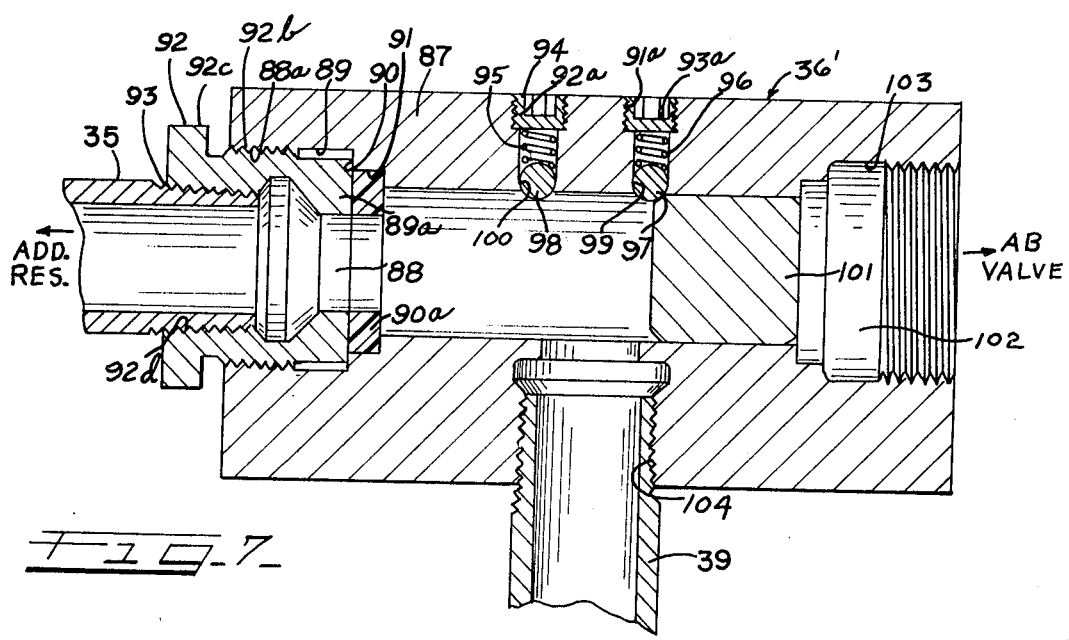
FIG-7-
INVENTOR
WILLIAM H. PETERSON
BY Richard J. Myers
ATT'Y.

RAILROAD CAR SPEED CONTROL MECHANISM

SUMMARY

This invention relates to speed control devices for railroad cars and in particular relates to an electrical pneumatic arrangement for braking the speed of the car at a certain car speed.

A general object of this invention is to provide for an improved electrical solenoid-operated brake pressure control valve energized by a car wheel-driven generator and centrifugal switch for closing the circuit beyond a certain car speed.

Another object of this invention is to provide a railroad car speed control device employing a wheel-driven generator and centrifugal switch operable in accordance with the speed of the railroad car for limiting the speed of the car, wherein the wheel-driven generator is provided with a flexible coupling to reduce vibration on the generator.

Still another object of this invention is to provide a speed control braking device of the type aforementioned wherein a closing circuit reed switch having magnetic flux collecting means is placed in close proximity to a ground-mounted magnet for completing the circuit of the speed control device.

Still another object of this invention is to provide for a pneumatic electrical brake system wherein the source of brake pressure maintains a positive pressurehead on a motor to keep the car wheel-driven generator out of contact with the car wheel during all trainline operations, such as under emergency braking conditions.

Still another object of this invention is to provide for an improved shuttle valve for conducting the air brake pressure either from the conventional AB valve of the railroad car or from an additional air pressurized tank via the solenoid valve to the brake cylinder.

These and other objects of the invention will become apparent from reference to the following description, appended claims and attached drawings.

BRIEF DESCRIPTION OF THE DRAWINGS

FIG. 1 is a partial view of the truck structure of a railroad car employing the novel speed control device of the invention;

FIG. 2 is a partial sectional view taken along line 2 — 2 of FIG. 1;

FIG. 3 is a schematic pneumatic and electrical circuit diagram with component parts of the inventive speed control mechanism;

FIG. 4 is a partial sectional view, with parts broken away, of the novel magnetic responsive reed switch structure;

FIG. 5 is a modified form of the structure for mounting the reed switch shown in FIG. 4;

FIG. 6 is a partial view with parts in section of the improved generator drive arrangement and centrifugal switch structure of the speed control device; and FIG. 7 is an enlarged view of the shuttle valve arrangement for selectively supplying pressurized air to the brake cylinder from either the pressurized fluid source of the speed control mechanism or from the standard AB valve arrangement of the conventional pneumatic brake system.

DETAILED DESCRIPTION

With reference to the drawings and in particular with reference to FIGS. 10– 3, there is shown a railroad car wheel 1 on a rail 2 and having attached to it the speed control device 3 which includes a generator-centrifugal switch unit 4 mounted on the framework or truck frames 8 by the mounting fixture 5. The speed control device 3 is of the type described in my co-pending patent application, Ser. No. 783,933 filed on Dec. 16, 1968, now U.S. Pat. No. 3,584,214 issued June 8, 1971, said co-pending patent application being incorporated herein by reference thereto. The unit includes the generator 12 and the centrifugal switch 18 of which each are driven by a common shaft means rotated by driving wheel 13. A magnetic-responsive reed switch unit 6 is also mounted on the fixture arrangement 5 and the generator-switch unit 4 is engageable with the wheel rim side 9 of the truck wheel. The speed control device further includes the magnet 7 which is mounted in the rail 2 and cooperates with the reed switch arrangement 6 for actuating the generator-centrifugal switch unit 4. The generator-centrifugal switch unit 4 has its generator wheel 13 placed in engagement with and removed from engagement with the wheel rim side 9 by actuation of the pneumatic motor 10 which moves pivot arm 14 about pivot means 15 to swing the generator and governor switch mounting bracket 11 carrying the unit 4. Bracket means 16 on truck means 8 fixedly carries pivot means 15 and switch unit 6. The speed control device 3 also includes a relay 17 (see FIG. 3) which is actuated by reed switch 6 and when vehicle speed is 4 m.p.h. or more the weights of the centrifugal switch 18 of unit 4 fly out sufficiently to cause switch 18 to complete the circuit 17a to the solenoid valve 31 for energizing the latter to open the valve 31 for supplying air under pressure to the brake cylinder 40 to brake the speed of the vehicle, as mentioned in said aforementioned co-pending patent application. In addition to the electrical circuit 17a with its respective electrical components of generator, centrifugal switch, magnetic responsive switch, relay, and solenoid, the speed control device 3 is provided with a pneumatic system 19 which includes the pressurized air bearing trainline 20, the standard AB valve 25 and its attendant AB valve line 21 and the AB valve- main reservoir line 22 and the main reservoir-AB valve line 23. The system 19 is further provided with the pneumatic motor line 26 which supplies pressurized air for operation of the pneumatic motor 10. The main reservoir 24 of the system includes the auxiliary portion 24a and the emergency portion 24b. Pressurized air line 22 has pressurized main reservoir-additional reservoir line 27 extending from it to the additional reservoir 29 and has a check valve 28 in it for permitting flow of pressurized air only from the auxiliary reservoir portion 24a to the additional reservoir 29. Further, there is provided a solenoid valve line 30 extending between the additional reservoir and the solenoid valve 31. A bleed hole line 32 extends from the solenoid valve 31 to the pressure relief valve 33 and is provided with a bleed hole 32a. The pressure relief valve 33 is comprised of the spring 33a and the bellows 33b. The shuttle or slide valve 36 is provided with a slide valve line 35 between it and the pressure relief valve 33. Free flowing piston 37 is held within the bore or chamber of the shuttle valve 36. The shuttle valve 36 is connected with the AB valve 25 by pressurized air line 38 and the shuttle valve 36 connects with the brake cylinder 40 by way of pressurized air line 39. The brake cylinder 40 is provided with the brake cylinder linkage 40a and the pressure relief valve 33 is provided with an air line 34 which goes to the atmosphere.

The pneumatic circuit in the instant application is inventive and differs from the prior art as, for instance, that disclosed in the aforementioned co-pending patent application in that, in the instant patent application, the auxiliary portion 24a of the main reservoir 24 supplies pressurized air directly to the additional reservoir 29 and the emergency portion 24b of the main reservoir 24 supplies, by means of pressurized air lines 23, 26, pressurized air to the pneumatic motor 10. Heretofore, the additional reservoir 29 and the pneumatic motor 10 were supplied with pressure from the trainline 20. Under the arrangement now used in the instant application, both the motor 10 and the additional reservoir 29 are supplied with a constant source of positive pressure instead of with pressurized air from the line 20. This has the advantage that, during emergency brake application, pressure remains in the line connecting the emergency reservoir with the AB valve, and the speed control device motor 10 will not cause engagement of the generator of the speed control unit 3 with the car wheel 1 under trainline operations. Further, the air for charging the additional reservoir is taken from the auxiliary portion 24a so if the speed control device should fail, the car brakes can be cut out and there is no tapping into the trainline 20. When the brake release rod of the car is pulled in the yard these exhaust the air under pressure in the reservoir tank sections 24a and 24b and motor 10 but not the additional reservoir 29 and this causes the generator wheel to engage the car wheel.

The operation of the speed control device 3 is as follows. The additional reservoir 29 is filled or charged with air as is the main reservoir 24 when the trainline 20 is coupled with another car for over-the-road or in trainline operation which is standard operating procedure for charging of the main reservoir 24. When the trainline 20 is in a disconnect position so that the railroad car is by itself and in a free rolling state, having passed a hump in the classification yard, the magnet 7 acts upon the relay actuating or reed switch means 6 to energize the relay 17 to complete the circuit to the generator 12. Next, the centrifugal switch means 18 completes the circuit to energize the solenoid valve 31 when the railroad car is rolling at speeds of 4 m.p.h. or in excess thereof. Then the pressurized air passes from the additional reservoir 29 through the solenoid valve 31 which is now in the energized or open position, through line 32 and then the pressure relief valve 33, line 35, and into the shuttle valve 36 to move the sliding free piston 37 to allow the pressurized air to pass into the line 39 and to the brake cylinder 40 for applying the vehicle brakes to slow down the car. The valve 36 thus serves to isolate the brake cylinder 40 from the existing conventional AB valve 25 and the main reservoir 24 when the speed control device is in use. Once the speed of the car has fallen below the predetermined speed of 4 m.p.h. the switch means 18 breaks the circuit and de-energizes the solenoid valve 31 to cut off the supply of pressurized air to the valve means 36. Then air bleeding through air bleed opening 32a in line 32 causes a drop in pressure across the diaphragm 33b to have diaphragm spring 33a raise the diaphragm 33b to permit air in the brake cylinder 40 to dump into tube 34 to rapidly exhaust the pressurized air to the atmosphere for removing application of the vehicle brakes to the vehicle wheel. During trainline operations when the solenoid valve means 31 is de-energized, air under pressure can only come from the main reservoir 24 via the AB valve 25 into the valve 36 to move the sliding free piston 37 to a position to permit the air under pressure to communicate with line 39 and not with line 35. The supply of air under pressure from the main reservoir via the AB valve to the brake cylinder is conventional operation.

With reference now to FIG. 4, there is shown an improved reed switch unit 6 which is carried on the pivot means 15 including the lower journal portion 41 of the mounting fixture 5 and encircling the bearing 42 about the pivot pin 43 which also extends through the bore 43a of the arm 45 which is welded by welds W to the reed switch housing 44 passing through the bore 46 of the arm 45. The housing 44 is provided with an end plug 47 at its left end and an end cap 48 welded to its right end. Inside the housing 44 are located elongated horizontally extending ferrite plates 49 and 50 on either side of reed switch contact arms insulating holder 51. The ferrite plate 49 is provided with a contact arm anchor 52 for carrying arm 54 extending into the insulator 51, and the plate 50 is provided with an anchor 53 carrying contact arm 55 extending into the insulator 51 above the arm 54 and being drawn toward and into contact with arm 54 when the reed switch unit 6 passes over the magnet 7 for completing the circuit 17a in order to energize the solenoid valve 31 should the vehicle exceed the speed of, say, 4 m.p.h. The leads 56 and 57 connect with ferrite plates 49 and 50 respectively and with the circuit 17a. The ferrite plates concentrate the magnetic flux of the magnet 7 to insure that the magnetic responsive contact arm 55 is magnetically affected and is pulled toward the contact arm 54. These plates 49 and 50 are usually made of ceramic ferro-magnetic materials. Such materials may have a spinel crystal structure having the general formula $XFe_2O_4$ where X is any divalent metallic ion having the proper ionic radius to fit in the spinel structure. The divalent ion can be manganese, iron, cobalt, nickel, copper, cadmium, zinc and magnesium.

FIG. 5 shows a modified form of the reed switch unit 6' wherein a prime (') is placed after the number of a similar part to the corresponding part in FIG. 4. For instance, the housing 44' relates or corresponds to the housing 44 of FIG. 4, etc. The main difference between the modified form shown in FIG. 5 of the reed switch unit is that there are no magnetic flux concentrating plates 49 and 50 used and, therefore, the housing 44' is shorter than the housing 44 and forms an L-shaped unit 6' with the support arm 45', whereas in FIG. 4 the support arm 45 and the housing 44 form an inverted T structure. Also, the member 47 is replaced by a threaded insert plug 58. In both instances the same insulator 51 is used.

The improved or modified generator centrifugal switch unit 4' shown in FIG. 6 differs from the unit 4 shown in FIGS. 1, 2 and 3 in that the modified unit 4' is provided with a flexible coupling arrangement to minimize shock on the generator and centrifugal switch portions of the unit. Specifically, the generator-centrifugal switch unit 4' includes an outer housing 62 in which extends an output shaft means 63 which is supported at its outer end in a bearing 64 carried in the bearing retainer 64a. A bearing 65 also supports the shaft means 63 on the opposite side of the wheel 66 that engages the railroad car wheel 1. The bearing 65 is held by the bearing retainer 65a which is held by retainer bolt 65b to the flexible coupling retainer or housing 68. The wheel 66 is carried on the wheel shaft 67 which is connected with the flexible coupling 69 of the output shaft means 63. The flexible coupling arrangement 69 includes the couple unit 70 and the couple unit 76. The couple unit 70 is held on the shaft 67 by pin 71 and the pin 75 holds the couple unit 76 on the shaft 67. Each couple unit, 70 and 76, has interlocking or meshing teeth means 72 between which is placed rubber lamination 73 to provide for the flexible coupling between the wheel 66 and the generator shaft 77 of the generator 77a. The generator, at its right end, as viewed in FIG. 6, has its shaft common with the shaft of the centrifugal switch arrangement 78 provided with centrifugal weights 79 which move switch plate or member 79a whereby its switch arm fixture 80 acts against bowed contact switch arm 83. The switch arm 83 has its end swinging outward to contact fixed contact 84, the movable arm 83 moving from its backing 85 to the fixed contact 84, the backing being carried by the housing end plate 86 of the housing 62 and the backing 85 carrying the arm anchor 82 supporting the movable contact arm 83. The movable contact arm 83 may be moved from its convex bowed condition shown in FIG. 6 to the concave bowed position with contact 83 touching contact 84 upon outward movements of weights 79 when vehicle speed increases.

As seen in FIG. 7, there is provided a novel shuttle valve 36' which is an alternate form of the shuttle valve 36 shown in FIG. 3. Specifically, the shuttle valve 36' includes a housing 87 that is provided with an inlet 88 from the additional reservoir 29. The inlet 88 has a threaded bore 88a and an intermediate annular recessed bore 89 of greater diameter which has a nut seat 90 and a threaded innermost countersunk seal bore 91. A nut structure 92 has a threaded intermediate portion 92b which is threaded into the threaded bore 88a and has a rotating lug portion 92c for turning the nut and has a nut internal annular end portion 89a which abuts against the nut seat 90 in the annular recessed bore 89. The nut structure 92 is also provided with an inlet threaded bore 92d which threads on the threaded end 93 of the air line 35 leading toward the additional reservoir 29. An annular seal 90a is located within the countersunk reduced seal bore 91 and abuts against the bottom of the nut end portion 89a. The housing 87 is provided with a pair of housing detent threaded bores 91a and 92a each receiving respective detent screws 93a and 94 holding their respective springs 96 and 95 against the respective detent balls 97 and 98 within the passages 99 and 100 for maintaining the shuttle valve 101 either against the left-hand side or right-hand side of the shuttle valve housing 87, as viewed in FIG. 7, in order to block the passage line 35 to the additional reservoir 29 or the passage line 38 to the AB valve 25. The housing 87 is provided with a passage 102 to the AB valve and includes an internal housing bore 103 and is otherwise constructed like the inlet 88 from the additional reservoir 29. The housing 87 is further provided with a threaded bore 104 leading to the passage line 39 to the brake cylinder 40, the threaded end of line 39 being received within the threaded bore 104. By this particular arrangement of the shuttle valve construction, the lines to the additional reservoir and the AB valve are properly sealed and the detent arrangement holds the shuttle valve 101 in the desired position depending on whether pressurized air is to come from the additional reservoir when the car is operating under speed control braking conditions in the classification yard or whether the pressurized air is to come from the AB valve during over-the-rail or in trainline operations for braking of the vehicle speed.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A speed control device for a railroad car to control the speed of the car within predetermined limits comprising:
   a wheel driven governor,
   speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder,
   conditioning means operatively connected with said speed control valve means and the governor and selectively controlling the operation of said valve means in accordance with the speed of the car,
   off-car mounted tripping mechanism being operatively associated with said conditioning means to operate same and to set the conditioning means to cause a supply of pressurized fluid to said speed control valve means when required,
   said governor comprising a speed responsive unit operable in accordance with the predetermined maximum speed of the car to cause operation of the valve means, and
   mounting means pivotally mounting the speed responsive unit on the car for movement of the speed responsive unit between operative and inoperative positions,
   said conditioning means including a magnetically responsive switch provided with magnetic flux concentrating means and said off-car mounted tripping mechanism including a magnet means operative upon the switch for closing said switch.

2. The invention according to claim 1, and
   said magnetic flux concentrating means consisting of ferrite material.

3. The invention according to claim 2, and
   said magnetic flux concentrating means including a pair of ferrite elements on either side of said switch.

4. A speed control device for a vehicle comprising:
   an electric circuit,
   an electric generator in said circuit and for mounting on the vehicle and operatively connectable with the vehicle wheel and drivable thereby,
   a speed responsive switch in said circuit and operatively connectable with said wheel and drivable thereby to complete the electric circuit to the generator in going from an open position to a closed position when the vehicle exceeds a predetermined speed,
   an off-vehicle trigger responsive switch element in said circuit having opened and closed circuit positions and mountable on said vehicle and connecting with the generator,
   a holding relay in said circuit being in series connection with said switch element and said generator whereby when said switch element is in the closed position said holding relay is energized, said holding relay being mountable on said vehicle,
   a solenoid actuated air valve for supplying and terminating the supply of air pressure to the associated vehicle brakes being in said circuit and having a series connected with said relay and said speed responsive switch and with said generator when said holding relay is energized, said solenoid valve being mountable on said vehicle,
   said speed responsive switch, in going from the open to the closed position upon the vehicle's exceeding a predetermined speed, causes the solenoid valve to be placed in a closed circuit series connection with the generator with the holding relay being energized whereby the solenoid valve is moved for supplying air pressure to brake the vehicle, whereupon when the vehicle speed falls below the predetermined speed the speed responsive switch opens the circuit and the solenoid valve closes off the air supply to the vehicle brakes, and
   mounting means carrying said speed responsive switch and said generator and being pivotal between an engaged position for operation of the speed control device in a speed control position and in a position where said speed control device is inoperative,
   said switch element having magnetic flux concentrating means for concentrating the magnetic flux of an associated ground-mounted magnet attendant to closing the switch element.

5. In a railroad vehicle having a frame structure and having ground engaging means, a vehicle speed control device comprising:
   a ground driven generator provided with shaft means driven by the rotation of said ground engaging means,
   vehicle mounted solenoid operated fluid supply valve,
   centrifugal speed responsive means operably engageable with said shaft means and operable upon a predetermined rotational speed of said ground engaging means for operably coupling said generator with the vehicle solenoid operated fluid supply valve for operating the latter to supply and terminate fluid under pressure to the associated vehicle brake means for operation thereof when the predetermined speed is exceeded,
   starter means operatively connected with said generator and said supply valve and operated by associated ground mounted energizing means to prepare for operation of said speed control device, and
   means mounted on said vehicle frame structure and carrying said generator to and from operable engagement with said ground engaging means,
   said starter means including a magnetic responsive switch having magnetic flux concentrating means acted upon by an associated ground-mounted magnet means to close said switch.

6. A speed control device for a railroad car to control the speed of the car within predetermined limits comprising:
   a wheel driven governor,
   speed control valve means to supply fluid under pressure from an associated source of pressurized fluid to an associated car brake cylinder for operating the associated car wheel brakes and operatively associated with said governor and opened thereby upon exceeding a predetermined maximum speed for supplying the fluid under pressure to the brake cylinder,
   conditioning means operatively connected with said speed control valve means and the governor and selectively controlling the operation of said valve means in accordance with the speed of the car,
   off-car mounted tripping mechanism being operatively associated with said conditioning means to operate same and to set the conditioning means to cause a supply of pressurized fluid to said speed control valve means when required,
   said governor comprising a speed responsive unit operable in accordance with the predetermined maximum speed of the car to cause operation of the valve means, mounting means pivotally mounting the speed responsive unit on the car for movement of the speed responsive unit between operative and inoperative positions, and shuttle valve means having first passage means communicating with the associated conventional AB valve and having second passage means communicating with the pressurized fluid source and having a shuttle valve movable between one of two positions to either prevent fluid communication with the conventional AB valve or with the pressurized fluid source, said shuttle valve being held in one of two positions by detent means.

7. The invention according to claim 6, and said detent means including a pair of detents, one of which holds the valve in flow blocking relation to the conventional AB valve and the other detent holding the shuttle valve in flow blocking relation to the pressurized fluid source.

8. A speed control device for a railroad car to control the speed of the car within predetermined limits comprising:

a wheel driven governor, speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder, conditioning means operatively connected with said speed control valve means and the governor and selectively controlling the operation of said valve means in accordance with the speed of the car, off-car mounted tripping mechanism being operatively associated with said conditioning means to operate same and to set the conditioning means to cause a supply of pressurized fluid to said speed control valve means when required, said governor comprising a speed responsive unit operable in accordance with the predetermined maximum speed of the car to cause operation of the valve means, and mounting means pivotally mounting the speed responsive unit on the car for movement of the speed responsive unit between operative and inoperative positions, said governor comprising a generator having a generator wheel engaging the car wheel and having a flexible connection between the wheel and the generator whereby the generator is insulated from shock.

9. The invention according to claim 8, and said governor including a centrifugal switch including a contact arm and a pair of weights operable upon said contact arm for completing an electrical circuit whereby said arm is flexed from one bowed condition to another in completing the circuit.

10. In a railroad vehicle having a frame structure and having ground engaging means, a vehicle speed control device comprising:

generator means including a ground driven generator provided with shaft means driven by the rotation of said ground engaging means, vehicle mounted solenoid operated fluid supply valve, centrifugal speed responsive means operably engageable with said shaft means and operable upon a predetermined rotational speed of said ground engaging means for operably coupling said generator with the vehicle solenoid operated fluid supply valve for operating the latter to supply and terminate fluid under pressure to the associated vehicle brake means for operation thereof when the predetermined speed is exceeded, starter means operatively connected with said generator and said supply valve and operated by associated ground mounted energizing means to prepare for operation of said speed control device, and means mounted on said vehicle frame structure and carrying said generator to and from operable engagement with said ground engaging means, said generator means including a generator wheel engaging said ground engaging means and said shaft means including a flexible connection between the generator wheel and the generator to reduce vibration on the generator.

11. A speed control device for a railroad car to control the speed of the car within predetermined limits comprising:

a wheel driven governor, speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder, conditioning means operatively connected with said speed control valve means and the governor and selectively controlling the operation of said valve means in accordance with the speed of the car, off-car mounted tripping mechanism being operatively associated with said conditioning means to operate same and to set the conditioning means to cause a supply of pressurized fluid to said speed control valve means when required, said governor comprising a speed responsive unit operable in accordance with the predetermined maximum speed of the car to cause operation of the valve means, and mounting means pivotally mounting the speed responsive unit on the car for movement of the speed responsive unit between operative and inoperative positions, said speed control device including a source of positive pressurized fluid and said mounting means including a pneumatic motor in fluid communication with said source of pressurized fluid for maintaining the motor under pressure preventing engagement of the governor with the associated car wheel during trainline operation.

12. A speed control device for a railroad car to control the speed of the car within predetermined limits comprising:

car wheel means and a governor driven thereby, speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder, conditioning means operatively connected with said speed control valve means and the governor and selectively controlling the operation of said valve means in accordance with the speed of the car, off-car mounted tripping mechanism being operatively associated with said conditioning means to operate same and to set the conditioning means to cause a supply of pressurized fluid to said speed control valve means when required, and pneumatic means including a first reservoir, a second reservoir, first conduit means supplying fluid to each reservoir, second conduit means connecting with each of the reservoirs for supplying braking fluid to the brake cylinder, said second conduit means including a first conduit connecting with the speed control valve means and with the first reservoir and a second conduit connecting with the second reservoir, two-way valve means adapted for connecting with the associated brake cylinder and connecting with each of the conduits, and means in said two-way valve means for selectively and alternately supplying communication between one of the conduits and the brake cylinder, said governor upon operating of said speed control valve means allowing communication of the first conduit with the brake cylinder and preventing communication of the second conduit with the brake cylinder, said two-way valve means having detent means for holding said valve means in one of two positions for selectively and alternately supplying communication between one of the conduits and the brake cylinder.

13. A speed control device for a railroad car to control the speed of the car within predetermined limits comprising:
car wheel means and a governor driven thereby,
speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder,
conditioning means operatively connected with said speed control valve means and the governor and selectively controlling the operation of said valve means in accordance with the speed of the car,
off-car mounted tripping mechanism being operatively associated with said conditioning means to operate same and to set the conditioning means to cause a supply of pressurized fluid to said speed control valve means when required,
pneumatic means including a first reservoir, a second reservoir, first conduit means supplying fluid to each reservoir, second conduit means connecting with each of the reservoirs for supplying braking fluid to the brake cylinder, said second conduit means including a first conduit connecting with the speed control valve means and with the first reservoir and a second conduit connecting with the second reservoir, two-way valve means adapted for connecting with the associated brake cylinder and connecting with each of the conduits, and means in said two-way valve means for selectively and alternately supplying communication between one of the conduits and the brake cylinder, said governor upon operating of said speed control valve means allowing communication of the first conduit with the brake cylinder and preventing communication of the second conduit with the brake cylinder, and
means pivoting said governor away from said car wheel means and including a pneumatic motor in fluid communication with said second reservoir for maintaining a positive pressure in the pneumatic motor to keep the governor disengaged from the car wheel means during trainline operation.

* * * * *